US012657188B2

(12) United States Patent
Ponjavic et al.

(10) Patent No.: US 12,657,188 B2
(45) Date of Patent: Jun. 16, 2026

(54) ENRICHING METRICS WITH APPLICATION EXECUTION CONTEXT

(71) Applicant: Sysdig, Inc., San Francisco, CA (US)

(72) Inventors: Aleksandar Ponjavic, Belgrade (RS); Bryan Nolan Seay, Cary, NC (US); Danko Saponjic, Belgrade (RS); Perica Milosevic, Belgrade (RS); Bojan Blagojevic, Vienna (AT); Thomas R. van Os, Walnut Creek, CA (US)

(73) Assignee: Sysdig, Inc., San Francisco, CA (US)

( * ) Notice: Subject to any disclaimer, the term of this patent is extended or adjusted under 35 U.S.C. 154(b) by 355 days.

(21) Appl. No.: 17/710,789

(22) Filed: Mar. 31, 2022

(65) Prior Publication Data

US 2023/0315726 A1     Oct. 5, 2023

(51) Int. Cl.
*G06F 16/2453*     (2019.01)
*G06F 11/34*     (2006.01)
*G06F 16/22*     (2019.01)
*G06F 16/2457*     (2019.01)

(52) U.S. Cl.
CPC ...... *G06F 16/2453* (2019.01); *G06F 11/3409* (2013.01); *G06F 16/2246* (2019.01); *G06F 16/24573* (2019.01)

(58) Field of Classification Search
CPC ........... G06F 11/3616; G06F 16/24568; G06T 11/206
See application file for complete search history.

(56) References Cited

U.S. PATENT DOCUMENTS

| | | | |
|---|---|---|---|
| 9,916,233 B1 | 3/2018 | Qureshi et al. | |
| 10,592,380 B2 | 3/2020 | Borello | |
| 10,732,810 B1 * | 8/2020 | Cohen | G06F 16/235 |
| 11,463,559 B1 * | 10/2022 | Agarwal | H04L 69/04 |
| 11,526,425 B1 * | 12/2022 | Karis | G06F 11/3452 |

(Continued)

FOREIGN PATENT DOCUMENTS

| | | |
|---|---|---|
| WO | WO 2018/160744 A1 | 9/2018 |

OTHER PUBLICATIONS

Github.com, "Pod Metrics", https://github.com/kubernetes/kube-state-metrics/blob/master/docs/pod-metrics.md, retrieved May 5, 2022, 9 pages.

Docs.Sysdig.com, "Run PromQL Queries Faster with Extended Label Set", https://docs.sysdig.com/en/docs/sysdig-monitor/metrics-dictionary/metrics-and-label-mapping/run-promql-queries-faster-with-extended-label-set/, retrieved May 5, 2022, 5 pages.

(Continued)

*Primary Examiner* — William P Bartlett
(74) *Attorney, Agent, or Firm* — Kim & Stewart LLP

(57)     ABSTRACT

Techniques for organizing and storing metrics for efficient querying is disclosed. A data collection system is implemented to receive, from a device, an original dataset comprising metrics of a component of a clustered application environment and metadata associated with the metrics. Based on the metrics, a tree structure containing a plurality of nodes is populated with the metrics and metadata. The data collection system generates an updated dataset containing the metrics, associated labels, and enriched labels based on the metadata. The updated dataset is stored within a database table. The data collection system receives a query for metrics. In response to receiving the query, the data collection system generates a result set containing at least a subset of the data values in the database table and at least one enriched label.

19 Claims, 9 Drawing Sheets

(56) References Cited

U.S. PATENT DOCUMENTS

| | | | | |
|---|---|---|---|---|
| 2008/0066051 A1* | 3/2008 | Stubbs | G06F 8/20 717/107 | |
| 2011/0138389 A1 | 6/2011 | Molnar et al. | | |
| 2016/0357618 A1 | 12/2016 | Degioanni et al. | | |
| 2017/0123956 A1* | 5/2017 | Lindo | G06F 11/3612 | |
| 2018/0048545 A1 | 2/2018 | Mishalov | | |
| 2018/0287876 A1* | 10/2018 | Strobel | H04L 41/142 | |
| 2020/0174905 A1 | 6/2020 | Borello | | |
| 2022/0138079 A1 | 5/2022 | Borello et al. | | |
| 2022/0413992 A1* | 12/2022 | Nguyen | G06F 16/9024 | |
| 2023/0236818 A1* | 7/2023 | Saeki | G06N 3/0442 717/172 | |

OTHER PUBLICATIONS

Borello, U.S. Appl. No. 16/783,099, filed Feb. 5, 2020, Office Action, Jul. 29, 2021.

Borello, U.S. Appl. No. 16/783,099, filed Feb. 5, 2020, Notice of Allowance and Fees Due, Nov. 17, 2021.

Borello, U.S. Appl. No. 15/959,153, filed Apr. 20, 2018, Notice of Allowance, Dec. 10, 2019.

Borello, U.S. Appl. No. 15/959,153, filed Apr. 20, 2018, Restriction Requirement, Oct. 24, 2019.

European Patent Office, "Search Report" in application No. PCT/US2019/028319, dated Jul. 8, 2019, 15 pages.

European Claims in application No. PCT/US2019/028319, dated Jul. 2019, 4 pages.

* cited by examiner

Data Collection System 110

Collector Service 212

Time Series API Processing Service 214

Time Series Database 216

| Metric _name | Some custom _label | TimeSeries | Container _ID | Container _Type | Container _Full_ID | Container _Name | Container _Image | Host _mac | Host _hostname _ID | Agent _tag _Cluster | Kube_pod _name | Kube deployment _name | Kube _cluster _name |
|---|---|---|---|---|---|---|---|---|---|---|---|---|---|
| PROM _METRIC | custom_ value_1 | {values, timestamps} | 1324 | container | docker/cnt_ 1234 | human resources | img101 | 23:32:69 | HR_prod | Agent _prod | test_pod | human resources | Cluster1 |
| | | | | | | | | | | | | | |
| | | | | | | | | | | | | | |

Figure 4:
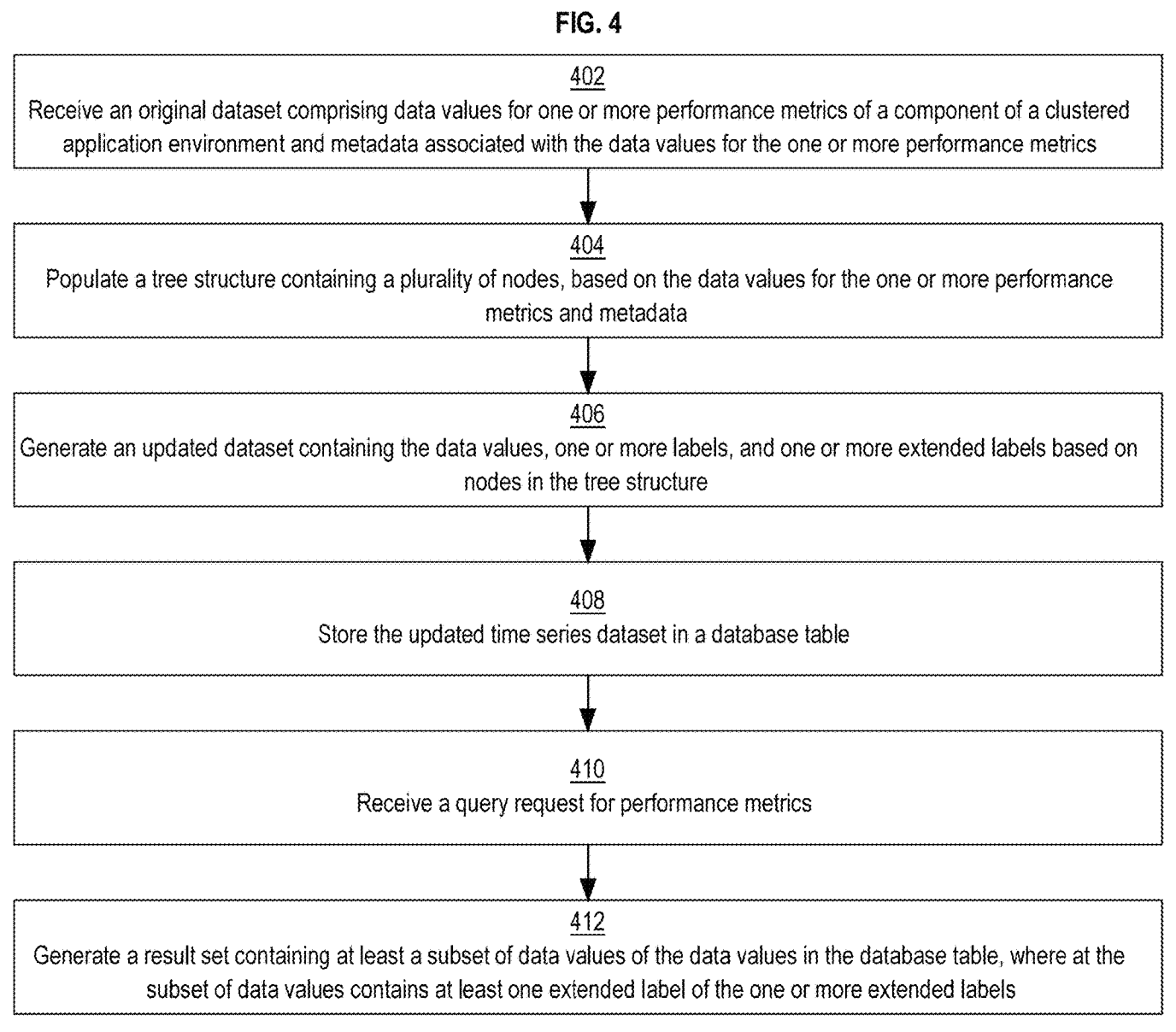

Receive an original dataset comprising data values for one or more performance metrics of a component of a clustered application environment and metadata associated with the data values for the one or more performance metrics

404

Populate a tree structure containing a plurality of nodes, based on the data values for the one or more performance metrics and metadata

406

Generate an updated dataset containing the data values, one or more labels, and one or more extended labels based on nodes in the tree structure

408

Store the updated time series dataset in a database table

410

Receive a query request for performance metrics

412

Generate a result set containing at least a subset of data values of the data values in the database table, where at the subset of data values contains at least one extended label of the one or more extended labels

FIG. 5

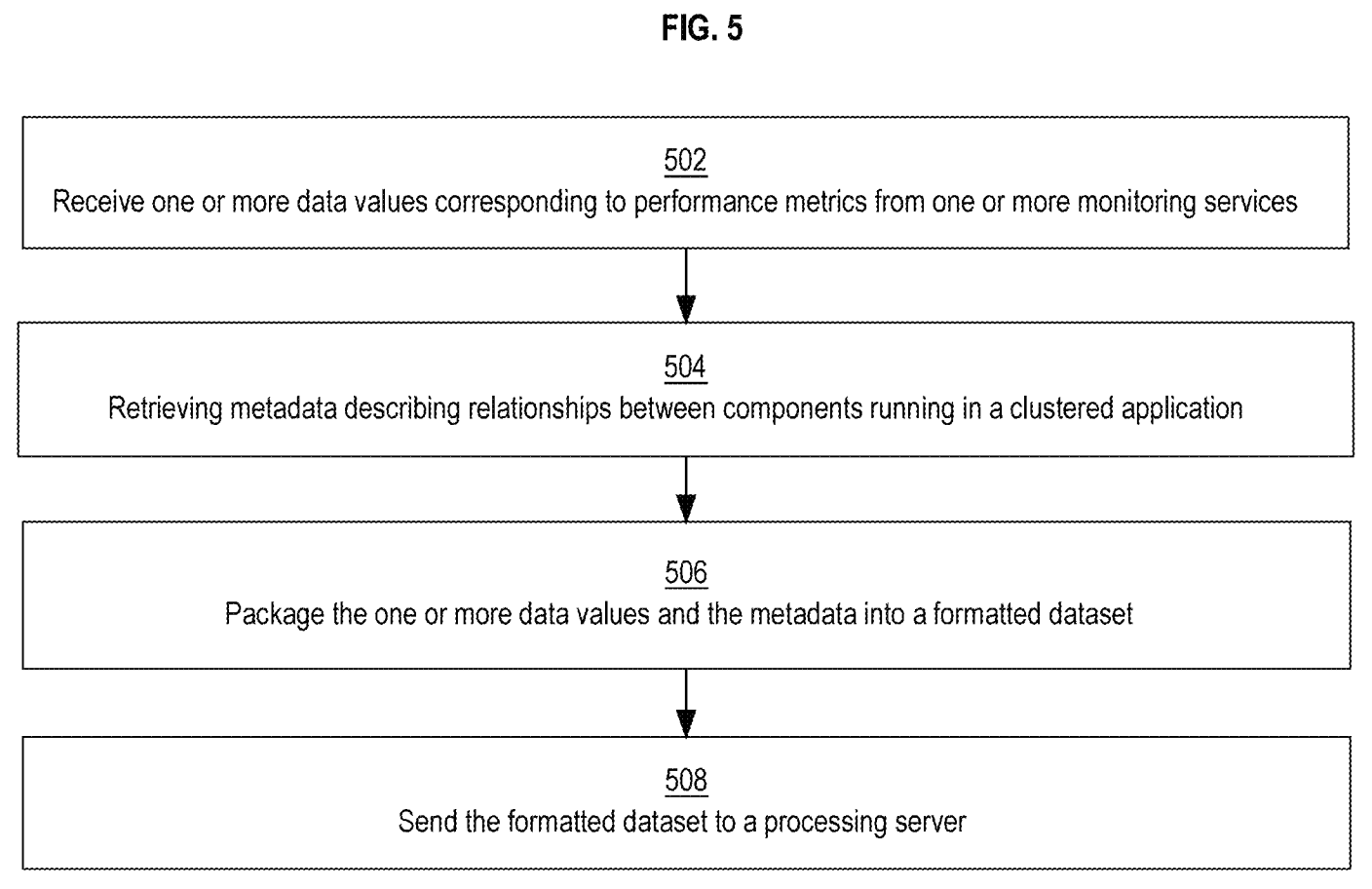

502
Receive one or more data values corresponding to performance metrics from one or more monitoring services 504
Retrieving metadata describing relationships between components running in a clustered application 506
Package the one or more data values and the metadata into a formatted dataset 508
Send the formatted dataset to a processing server

ENRICHING METRICS WITH APPLICATION EXECUTION CONTEXT

FIELD OF THE DISCLOSURE

The present disclosure relates to monitoring of a clustered application environment. More specifically, the present disclosure relates to augmenting metrics with metadata in the clustered application environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Clustered application environments are often used to run an array of software products. Clustered servers may run multiple instances of software applications running at the same time. One of the benefits of implementing a clustered server is the ability to scale up when demand requires additional processing resources. Managing resources in a clustered application environment typically requires extensive monitoring of software applications, system resources, and hardware resources. Many clustered application environments may implement containers and container images to run the desired software. A container is a standard unit of software that packages up code and its dependencies so that the application may be able to run in any computer environment.

Monitoring services provide a way to monitor various components of a clustered application environment including, applications running within containers and any other system or hardware resources used by components of the clustered application environment. Metrics gathered by the monitoring services are stored and may be queried for the purposes of understanding and diagnosing how well the clustered application environment is performing. However, many monitoring applications provide metrics that are localized to the specific resource being monitored. It would be helpful to enable efficient retrieval of metrics that include additional context information.

BRIEF DESCRIPTION OF THE DRAWINGS

In the drawings:

FIG. 1 is a diagram illustrating an example of a customer-host environment implemented to monitor performance of the customer-host environment, in an embodiment.

Figure 2A:
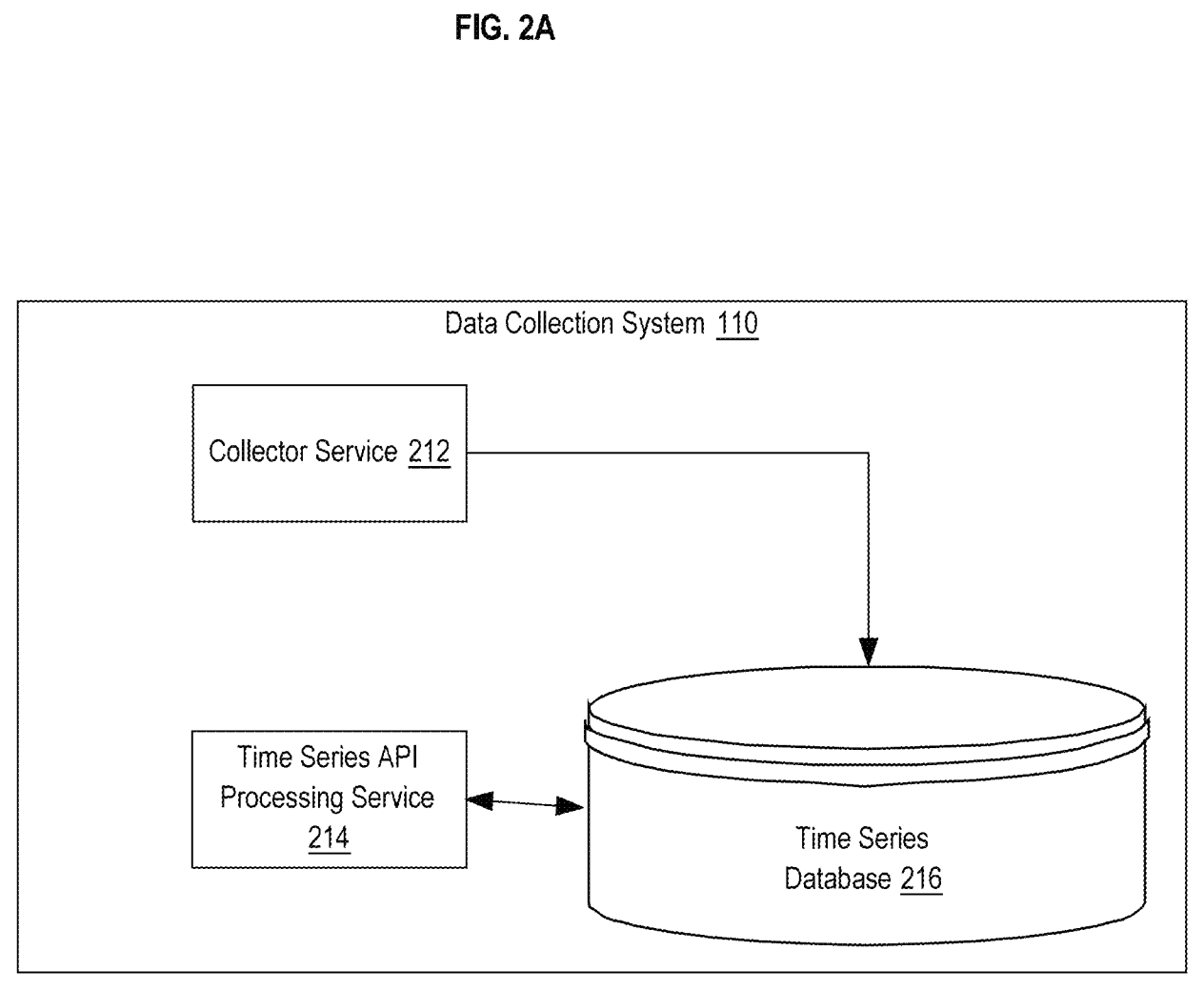

FIG. 2A is an example diagram of a data collection system, in an embodiment.

FIG. 4 is a flowchart depicting receiving metrics, storing metrics with enriched labels, and processing query requests for the metrics, in an embodiment.

FIG. 5 depicts a flowchart for packaging and sending metrics or metadata to the data collection system, in an embodiment.

DETAILED DESCRIPTION

Figure 2B:
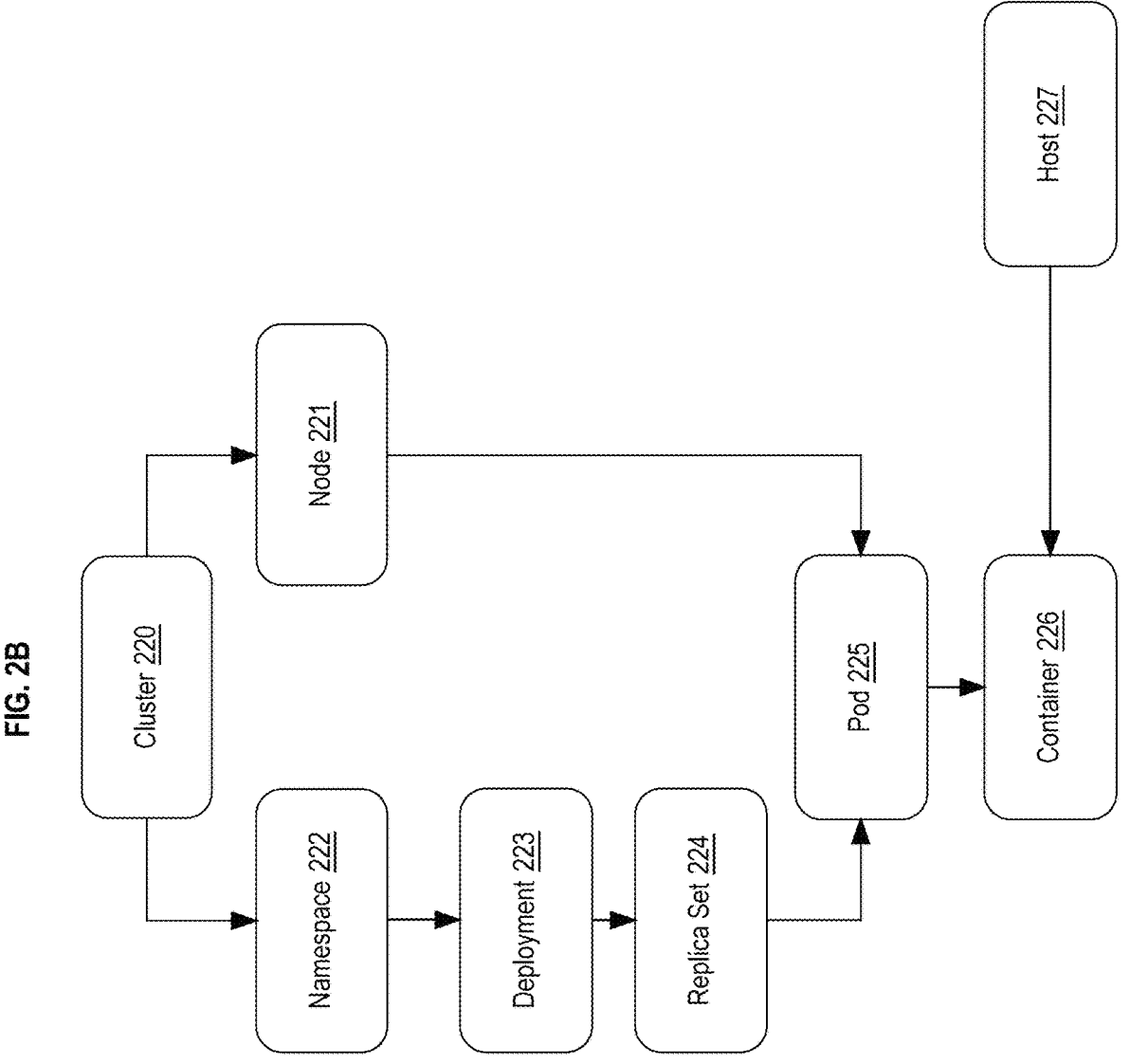
FIG. 2B is an example diagram showing relationships between entity types used within the customer-host environment, in an embodiment.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:

1.0 General Overview
2.0 Structural Overview
3.0 Functional Overview
    3.1 Data Collection System
    3.2 Customer-Host Environment
    3.3 Example Tree Structure
4.0 Procedural Overview
    4.1 Data Collection System Processing
    4.2 Customer-Host Agent Processing
5.0 Implementation Example—Hardware Overview
6.0 Extensions and Alternatives

1.0 General Overview

A data collection system for collecting and organizing metrics and metadata related to application execution context in a clustered application environment are disclosed. The data collection system is programmed or configured to receive, organize, and store the metrics in a manner that facilitates efficient querying of the metrics by user devices. Metrics are measurements of components within a clustered application environment. Metrics may include, but are not limited to, performance metrics, customized metrics, and metrics describing features of objects, components, or any other type of entity. Examples of performance metrics may represent measurements such as usage of central processing units within a container or host machine, memory usage within a container or host machine, network latency, processing latency related to executing tasks, and any other measurable metric related to the performance of a clustered application environment. A data collection system may be implemented to receive, organize, and store metrics.

In some embodiments, the data collection system may be programmed or configured to receive metrics measured by one or more monitoring services. The metrics received contain a dataset of values and may contain metadata describing context for the dataset of values. For example, the dataset of values may be a time series of data values and a corresponding timestamp for each data value. The metadata may include associated attributes that provide context to the time series. For instance, if the time series represents central processing unit (CPU) usage by a container, then the associated metadata may provide identifier information for the container such as, container name, container_ID, and a host ID that identifies the host on which the container is running. The metadata associated with the time series may be referred to as a label.

In some embodiments, the data collection system may use a tree structure to organize the dataset of values according to how the clustered application environment is configured. The tree structure may include a plurality of nodes that are configured to store data values and labels that define attributes and metadata associated with the data values. The data collection system may use the hierarchy defined by the tree structure to populate nodes, within the tree structure, with the data values and the metadata. Upon populating the tree structure, the data collection system may generate an augmented time series that contains the data values corresponding to a metric, labels corresponding to contextual metadata provided by the performance monitoring service, and enriched labels derived from the additional metadata. The additional metadata may represent further contextual information that described how the metric relates to other entities within the clustered application environment. The augmented time series may be stored within a time series database table.

In some embodiments, the data collection system may receive a query request for data stored in the time series database. In response to receiving the query request, the data collection system may generate a result set containing the desired data values and enriched labels.

In some embodiments, the data collection system may receive the metrics from an agent running within the clustered application environment. The agent may be programmed or configured to receive the metrics from one or more monitoring services. The agent may generate metrics from data retrieved from the underlying operating system. The agent may generate metrics from data retrieved via eBPF or via a kernel module. The agent may retrieve configuration information, such as metadata, describing how components in the clustered application environment are configured. The agent may package the metrics and the metadata into a formatted dataset and may send the formatted dataset to the data collection system for processing and storing.

User systems managing the clustered application environment typically monitor performance by querying past performance metrics in order to determine whether their application is performing at a desired level. Performance queries may involve complex queries that aggregate and manipulate performance data at various entity levels. Conventionally, the performance queries need to be implemented as multiple table joins and other aggregation steps that use intensive processing resources to complete. For example, if a container utilizes a central processing unit (CPU) on a host machine, then the monitoring application may record CPU usage of that specific container and may report the usage at various time periods for that specific container. The records may then be stored within a searchable database. If the host machine has multiple containers running and a subset of those containers belong to a specific group of containers, then querying the overall CPU usage of the specific group of containers would involve querying the CPU usage data for each container that belongs to the specific group and aggregating the CPU usage values to generate a sum CPU usage. Executing these types of queries typically requires joining multiple tables that include the necessary information such as the CPU usage on specific containers, identifying which containers belong to a specific host, and identifying which containers on the specific host, belong to the specific group.

The data collection system disclosed herein improves the performance of executing queries by generating augmented data that includes enriched labels describing the various groups and components related to the metrics. For instance, data describing aggregating the CPU usage of a container may be augmented to include information describing in which host, deployment, namespace, and cluster region the container belongs. By storing the metrics with the enriched labels such that they can be accessed in one read operation, the data collection system is able to process query requests more efficiently, as the data collection system does not need to perform the same number of join functions as conventional systems, which conventionally store the metrics as they are received.

2.0 Structural Overview

In some embodiments, software applications are deployed into managed software containers. For instance, an application may be packaged as a deliverable image that may be loaded and executed in multiple instances of a software container. A software container provides a portable execution environment that may insulate an application from some aspects of a physical computer that hosts the container. Multiple instances of a same application in multiple container instances may provide scaling for increased throughput, handling spikes in application demand, redundancy for high availability, and hardware independence for vertical scaling. A software container may be deployed within a virtual machine, a virtual operating system, or any other infrastructure for managed execution of applications. An application may be referred to as a containerized application, a clustered application, or a distributed application, herein. A software container may be referred to as simply a container, herein.

In some embodiments, multiple instances of a same or different software containers are managed by a container cluster framework for remotely administering multiple instances of a same or different distributed application. In an embodiment, a pod is a deployable object that may represent an instance of a running process managed by a Kubernetes framework. A pod may contain one or more containers. The Kubernetes framework is an open-source platform for managing containerized applications and services. Embodiments are not limited to only using Kubernetes, other embodiments may implement any type of deployment framework for a distributed system.

Performance statistics of distributed applications, containers for the applications, and hardware used by the applications may be monitored. In various embodiments, various combinations of monitoring infrastructure that provide discovered and monitored data may include the container cluster framework, the application itself, and dedicated monitoring services and agents. Monitored data may include metrics and configuration and topology details such as release versions, hosts, ports, and container names that may be indicated through annotations. Metrics are provided by on-demand or periodic network polling of well-known or assigned network ports and according to custom or standardized communication protocols and formats such as hypertext transfer protocol (HTTP) and JavaScript object notation (JSON). For example, a pod may receive a monitoring poll as an HTTP request on a network port. The HTTP request may or may not identify particular metrics, and the pod may reply by sending an HTTP response that contains measurement values such as formatted as name-value pairs. Such metrics may include current resource consumption such as CPU cycles, volatile memory, and network bandwidth. Repeated polling of metrics may provide recordable history of the configuration and performance of each pod, container, and computer.

Figure 1:
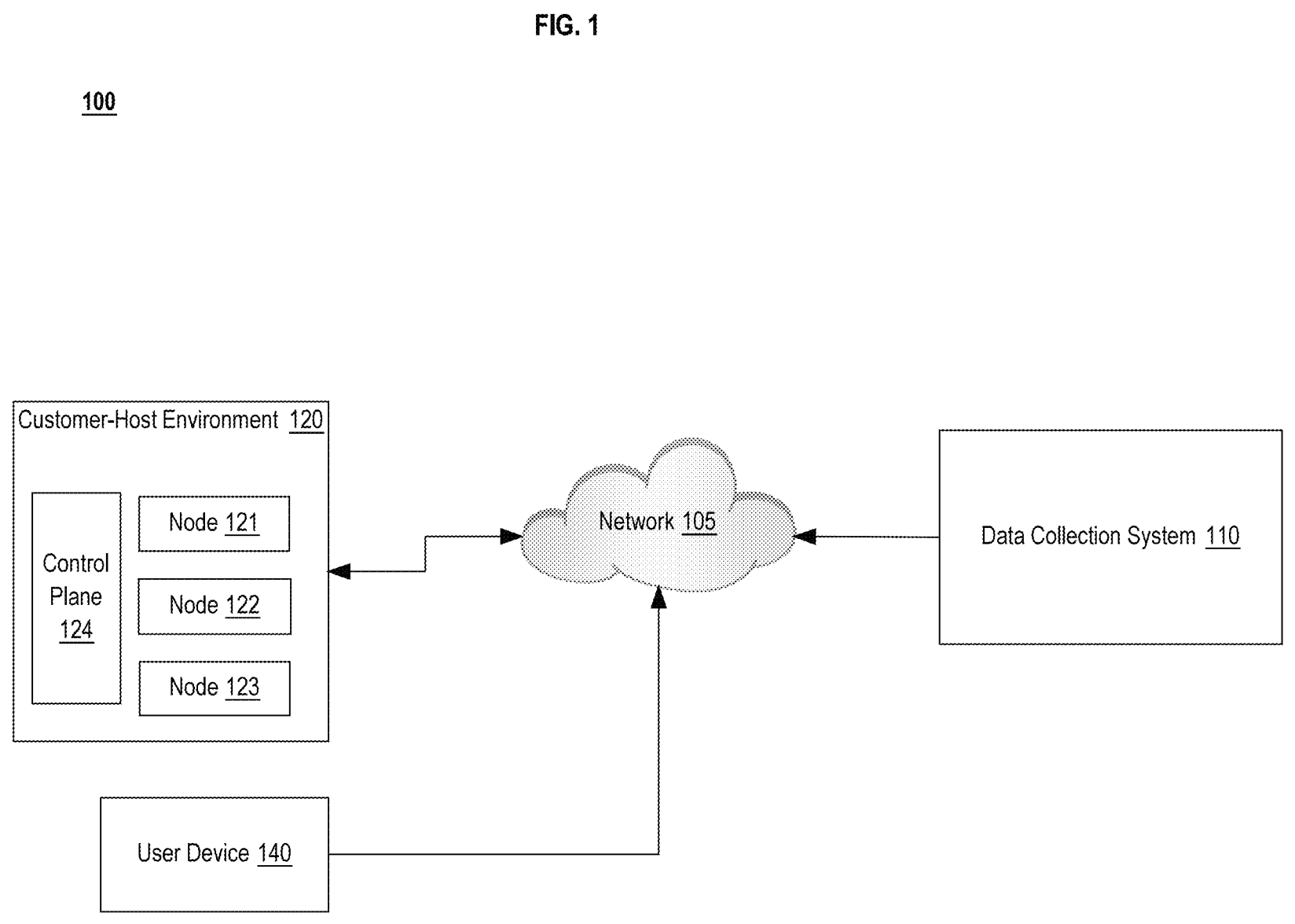

FIG. 1 is a diagram illustrating an example of a customer-host environment implemented to monitor performance of the customer-host environment. System 100 contains a data collection system 110, a customer-host environment 120, and a user device 140 communicatively coupled via network 105. In an embodiment, the customer-host environment 120 represents an execution environment for client applications. The customer-host environment 120 may include one or more host computers running one or more containerized client applications. The customer-host environment 120 may include a client agent implemented to collect metrics about the customer-host environment 120 and provide the metrics to the data collection system 110. Metrics collected may include, but are not limited to, metrics tracking performance of containerized applications, container resources, processor and memory resources, and any other hardware and/or software resources provisioned to deployments within the customer-host environment 120. In an embodiment, the client agent implemented may collect metrics from various sources including, but not limited to, process-level metrics such as system calls, operating system level metrics such as cpu cores used, metrics using statsd protocol, Java Management Extension metrics, http endpoint metrics defined by Prometheus protocol, or any other metrics.

FIG. 1 depicts the customer-host environment 120 with nodes 121, 122, 123 and control plane 124. Nodes 121, 122, 123 may represent a set of worker machines that are configured to run containerized applications. Control plane 124 represents an entity configured to manage the nodes 121, 122, and 123. In some embodiments, control plane 124 may be a service that runs on multiple computing devices. An example of control plane 124 may include Kubernetes.

In an embodiment, the data collection system 110 represents a system for collecting, processing, and storing metrics for the customer-host environment 120. For example, the data collection system 110 may receive metrics recording CPU usage by each containerized application. In an embodiment, the data collection system 110 may be configured to receive metrics and metadata from other sources, such as data server metrics provided by a third-party storage service such as Amazon Web Services' (AWS). For example, AWS may provide data server metrics and metadata to the data collection system 110. The data collection system 110 may receive from the agent running on the customer-host environment 120 an aws_instance identifier for a host running on an AWS server. The data collection system 110 may use the aws_instance identifier to associate AWS metadata, provided by the AWS server, to other metrics provided by the agent running on the customer-host environment 120. The data collection system 110 is configured to collect metrics and contextual data describing relationships between entities in the clustered application environment that are related to the performance data. The data collection system 110 is configured to process the collected data by aggregating the metrics and the contextual data into a combined dataset. The combined dataset may represent the metric and related entity information, which have been flattened into a single object containing the metric and all relevant metadata providing a full contextual information about the metric. The data collection system 110 may store the metrics in a database which may be queried against by user devices. For instance, a user device may connect to the data collection system 110 and may execute a query request for the average processor usage across all the containerized applications running on the customer-host environment 120.

User device 140 represents a computing device, used by a user, to query performance data from the data collection system 110. In an embodiment, user device 140 may implement a user interface for generating and sending metric queries to the data collection system 110 for processing. The user device 140 may implement Application Programming Interfaces (APIs) specific to the data collection system 110. In an embodiment, the user device 140 may represent any type of computing device including, but not limited to, a laptop, a desktop, a tablet, a smartphone, and any other computing device that implements data collection system 110 specific APIs.

Each of the customer-host environment 120, data collection system 110, and user device 140 are communicatively coupled to each other via network 105. In an embodiment, the network 105 facilitates the exchange of communication and collaboration of data between each of the customer-host environment 120, data collection system 110, and user device 140. The network 105 may be any type of network that provides communications, exchanges information, and/ or facilitates the exchange of data between the customer-host environment 120, data collection system 110, and user device 140. For example, the network 105 may represent one or more local area networks (LANs), wide area networks (WANs), metropolitan area networks (MANs), global interconnected internetworks, such as the public internet, public switched telephone networks ("PSTN"), or any other suitable connections or combinations thereof that enable the customer-host environment 120 to send information to the data collection system 110. Each such network 105 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 105 and the disclosure presumes that all elements of FIG. 1 are communicatively coupled via network 105.

3.0 Functional Overview

3.1 Data Collection System

FIG. 2A is an expanded diagram of the data collection system 110. In an embodiment, the data collection system 110 contains sets of instructions, services, or modules which, when executed by one or more processors, perform various functions related to collecting and aggregating different metrics from multiple sources and storing the aggregated metrics in persistent storage for later retrieval. In FIG. 2A, the data collection system 110 is configured with a collector service 212, a time series API processing service 214, and a time series database 216. The data collection system 110 depicted in FIG. 2A represents just one illustrative example of the data collection system 110 and is not intended to be limited to having only the services depicted in FIG. 2A. For instance, the data collection system 110 may include fewer or additional services and modules not currently shown in FIG. 2A.

FIG. 2B is an example diagram showing relationships between entity types used within the clustered application environment. The entity types depicted in FIG. 2B only represent a sample of entity types that may be used in the customer-host environment 120 and are meant to illustrate the relationships between the sample of entity types depicted. Cluster 220 is an entity type that represents a set of nodes implemented to run containerized applications. Node 221 is an entity type that represents a machine, either a physical machine, such as a server computer, or a virtual machine. Node 221 maintains local daemons and/or services configured to run pods. Namespace 222 is an entity type that represents a group of objects identified for a particular purpose or task. For example, a "human resources" namespace may represent all objects that belong to the business group "human resources" of the customer-host environment 120. Similarly, a "software development group" or "sales team group" namespace may represent all objects that belong to the sales team group environment of the customer-host environment. Deployment 223 is an entity type that represents an object that manages replica sets and provides declarative updates to pods. Replica set 224 entity type is an object that ensures that there is a specified number of pods running at any given time. Pod 225 represents a single instance of a running process within cluster 220. Pod 225 may run one or more containers. Container 226 represents a portable execution environment that insulates a running application from aspects of a host that hosts the container. Host 227 is an entity type that refers to the physical hardware upon which the container 226 is running. The entity types described in FIG. 2B may be used herein to describe relationships between different entities that make up the customer-host environment 120.

Referring back to FIG. 2A, in an embodiment, the collector service 212 is implemented to receive metrics from one or more agents running on the customer-host environment 120, analyze labels that help identify related entities in the customer-host environment 120, and augment time series data that represents metrics. Metrics may be received in the form of a time series dataset. A time series is a set of data points indexed in time order. For example, a time series of CPU percent usage may be a dataset of CPU percent values indexed using timestamps for when each CPU percent value was observed. Labels representing basic contextual metadata, which identify the entity, such as a container, may be provided with the time series. For example, the time series of CPU percent usage may have associated labels identifying the container for which the CPU percent usage applies, such as container name and container ID, identifying the host machine on which the CPU resides, and any other attributes that may be useful for identifying the time series data.

In an embodiment, the collector service 212 may receive metrics from the customer-host environment 120 in the form of a binary large object (blob) or any other data object that contains time series data of metrics and other metadata about the customer-host environment 120. The blobs may include time series data for various different metrics and their associated labels, as well as any other additional metadata about the customer-host environment 120. For example, the metric, CPU percent usage, for a particular container may include: an array of CPU usage percent values and their associated timestamps, labels identifying a mac address of the host machine hosting the particular container, a container ID used by a host machine to identify the particular container, and a container name assigned to the particular container. Additional metadata included in the blob may include container information from other metrics in the blob, customer-host environment configuration information, or a combination of both. For example, additional metadata may include container information about the pod and cluster for which the particular container belongs and cloud provider information. In another example, the additional metadata in the blob may include cloud provider information.

In another embodiment, the collector service 212 may be configured to receive metrics directly from other external monitoring services that are not directly associated with the customer-host agent 230. For example, if an external monitoring service represents an AWS-specific monitoring service implemented to collect AWS-specific metrics and the AWS-specific monitoring service and the collector service 212 implement the Prometheus remote write protocol, then the collector service 212 may be able to directly receive AWS-specific metrics via the remote write function from the AWS-specific monitoring service, as the AWS-specific monitoring service would directly send AWS-specific metrics to the collector service 212. Examples of implementing the Prometheus remote write protocol are not limited to AWS-specific monitoring services and may be implemented by any other monitoring service.

The following is a representation of time series data and associated metadata that may be in a blob received from the customer-host environment 120:

```
container_cpu_used_percent {
    host_mac:            "a3:34:65",
    container_id:        "age2b1732",
    percent_used:        "25",
    timestamp:           "00:01:39"
}
container_info {
    host_mac:            "a3:34:65",
    container_id:        "age2b1732",
    container_name:      "test_container",
    cluster:             "prod",
    pod:                 "worker-12",
    container_image: "quay.io/worker:123"
    namespace: "miner",
    deployment: "worker"
}
cloud_provider_info {
    host_mac:            "a3:34:65",
    region: "us-east",
    resource_type: "EC2",
    instance_type: "c6i"
}
``` where container_cpu_used_percent may represent a time series for CPU percent used values at specific timestamps and the labels host_mac and container_id. The set of labels {host_mac, container_id} may be used to identify the specific container and associate the container to its host, pod, cluster, and cloud region. For example, the container_cpu_used_percent time series may be associated with container_info metadata based on the host_mac and container_id labels. Similarly, the container_cpu_used_percent time series may be associated with the cloud_provider_info metadata based on the host_mac and cloud_provider_region labels.

If the time series data and associated metadata described above are conventionally stored in a database as the data is received, the time series data would be stored using three different database tables, one for each object type, container_cpu_used_percent, container_info, and cloud_provider_info. If a user device 140 wants to run a query for average CPU usage across all containers in the "us-east" cloud provider region, the query will have to include a join of all three database tables to group CPU percent usage based on cloud provider region in order to calculate an average CPU usage. Running a complex query with multiple joins will normally require significant processing resources and time to complete the execution, which is not desirable.

Therefore, the collector service 212, upon receiving the blob, may determine relationships between entities based upon labels associated with the time series and other metadata received with the time series data. In an embodiment, the collector service 212 may determine relationships between the time series data and associated metadata in the received blobs using a tree structure that maps different types of entities and time series data. The tree structure may represent an entity-metric hierarchical tree structure that contains entities that have been monitored and their corresponding metrics. Each entity in the tree structure may be a parent of multiple other entities in the tree structure and may contain a number of metrics that have been collected by an agent. For example, a host entity may be a parent for each container entity running within the host and the host entity may contain host-based metrics such as host_cpu_usage and host_memory_usage. Each node in the tree structure has been defined or derived from the metadata received by the collector service 212. For example, the customer-host agent 230 may provide, for each host, metadata describing the host, corresponding containers, and programs running on the host, as well as orchestrator metadata such as Kubernetes. The received metrics from the customer-host agent 230 are then associated with their corresponding entities. In an embodiment, the tree structure is an in-memory tree structure that is used during data ingestion to determine relationships between entities and metrics received by the collector service 212. The tree structure is described in detail in the EXAMPLE TREE STRUCTURE section herein.

In an embodiment, the collector service 212 may use the links between nodes and parent nodes in the tree structure to merge metadata and time series together to form a single dataset containing the time series for a metric and enriched labels, representing additional contextual metadata from other nodes associated with the metric. The linked data may be stored within the time series database 216. For example, the container_cpu_used_percent may be merged with labels from the container_info and cloud_provider_info to produce the following:

```
container_cpu_used_percent_with_enriched_labels {
    host_mac:                      "a3:34:65",
    container_id:                  "age2b1732",
    container_name:                "test_container"
    percent_used:                  "25",
    timestamp:                     "00:01:39"
    kube_cluster_name:             "prod",
    kube_pod_name:                 "worker-12"
    cloud_provider_region: "us-east"
}
``` where the container_cpu_used_percent_with_enriched_labels time series may be stored within a database table within the time series database 216. The enriched labels added to the time series may be given customized names to distinguish them from the original label and to prevent any label name clashes. In an embodiment, the customized labels may be based on a fully qualified name describing the labels context. For example, the original label "cluster" in container_info may be changed to "kube_cluster_name". By using a customized label name, the collector service 212 may maintain backward compatibility for queries on the original labels as the data may be stored using separate tables for the container_info and cloud_provider_info time series data.

In an embodiment, the time series database 216 may represent a storage device implemented to store metrics for the customer-host environment 120 in a time series database. A time series database is a database optimized for storing time series data through associated pairs of times and values. The time series database 216 may include tables specifically configured to store metrics, associated labels, and enriched labels associated to the metrics based on the tree structure. For instance, a table may be created to store the time series and enriched labels in the example illustrated by the container_cpu_used_percent_with_enriched_labels dataset above. If user device 140 wants to run a query for average CPU usage across all containers in the "us-east" cloud provider region using the new table that stores the container_cpu_used_percent_with_enriched_labels dataset, then the query will only need to query data within the new table without the need to perform a join across multiple tables. Thereby, reducing the processing overhead associated with a query that contains a complex join.

In an embodiment, time series database 216 may contain one or more tables implemented to store the time series and enriched labels. For example, each table in the time series database 216 may be configured to store a time series for a specific metric along with each of the enriched labels associated with that metric. In other embodiments, tables may be configured to store multiple sets of metrics along with their associated labels and enriched labels.

In an embodiment, the time series API processing service 214 is implemented to act as an interface for users querying metric data stored in the time series database 216. For example, a user, using user device 140, may connect to the data collection system 110 and execute queries for data using a time series API provided by the time series API processing service 214. The time series API processing service 214 may receive a query request from the user device 140, and process the query request to generate a result set for the user device 140. The time series API processing service 214 may send the result set back to the user device 140. In an embodiment, the time series API, provided by the time series API processing service 214, may be an extension of an already existing database query language. For example, the time series API may be based on PromQL, a functional query language created by Prometheus.

3.2 Customer-Host Environment

Figure 2C:
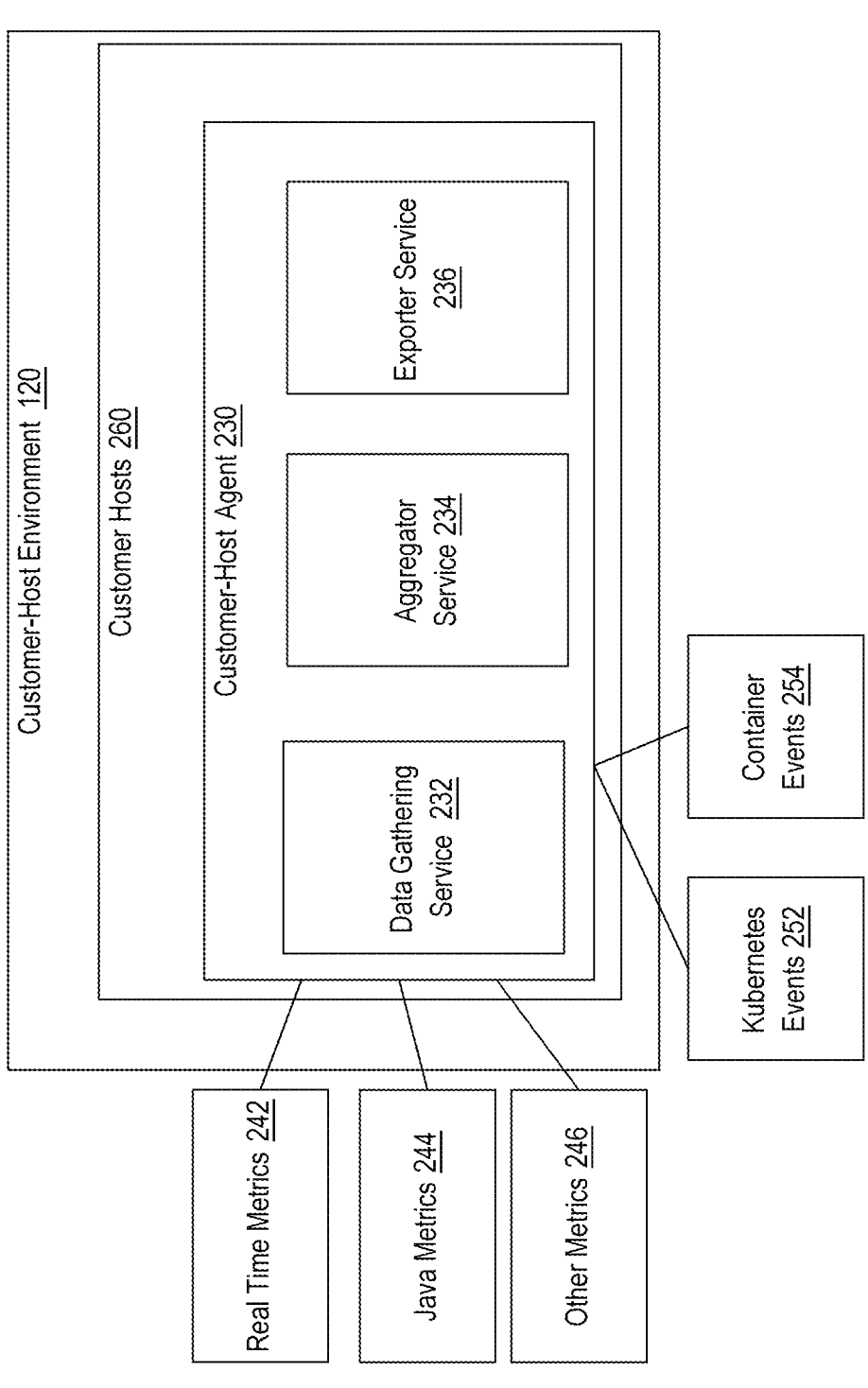
FIG. 2C is an example diagram of the customer-host environment, in an embodiment.

FIG. 2C is an expanded diagram of the customer-host environment 120. The customer-host environment may represent a deployment of a customer's clustered application environment which may include a distributed cluster of nodes for executing the customer environment. In an embodiment, the customer-host environment 120 contains sets of instructions, services, or modules which, when executed by one or more processors, perform various functions related to a customer-host agent collecting and sending metrics from multiple sources to the data collection system 110. In FIG. 2C, customer-host environment is configured with a customer-host agent 230 and customer hosts 260. The customer-host environment 120 depicted in FIG. 2A represents just one illustrative example of the customer-host environment 120 and is not intended to be limited to having only the customer-host agent 230 and customer hosts 260 depicted in FIG. 2C. For instance, the customer-host environment 120 may include fewer or additional services and modules related to deployment and execution of the customer-host environment not currently shown in FIG. 2C. Customer hosts 260 represent one or more physical host devices that make up the customer-host environment 120.

In an embodiment, the customer-host agent 230 is implemented to collect and send metrics from multiple sources to the data collection system 110. The customer-host agent 230 includes a data gathering service 232, an aggregator service 234, and an exporter service 236. The customer-host agent 230 may reside on any or all of the devices that make up the customer hosts 260.

In an embodiment, the data gathering service 232 may be implemented to retrieve and/or receive metrics from various nodes within the customer-host environment 120. The data gathering service 232 may retrieve and/or receive metadata, which describes configurations and relationships between entities in the customer-host environment 120. The metadata may come from hosts within the customer-host environment and may represent Kubernetes events and container events based on a Kubernetes protocol and/or any other established protocol.

In an embodiment, real time metrics 242, java metrics 244, and other metrics 246 represent the different types of metrics and events received from different sources by the data gathering service 232. For example, real time metrics may represent metrics based on a Prometheus protocol. The java metrics 244 may represent Java metrics related to Java Runtime environments implemented on the customer-host environment 120. The other metrics 246 may represent other monitoring services that monitor performance of various components in the customer-host environment 120.

In an embodiment, kubernetes events 252 and container events 254 represent the different types of metadata that may added to the metrics received from different sources. The kubernetes events 252 may represent events based on a Kubernetes protocol for identifying any state changes, errors, or other messages that may be broadcast to the customer-host environment 120. Container events 254 may represent events generated by containers in response to any changes or errors encountered by containers running in the customer-host environment 120.

In an embodiment, the aggregator service 234 is implemented to aggregate metrics and gathered metadata and configuration information together to generate datasets of data for the data collection system 110. For example, a CPU percent usage time series, retrieved from an operating system running on a particular node, of a container in the customer-host environment 120 may include a value of CPU percent used, a timestamp, and a container ID. The aggregator service 234 may aggregate the data from the CPU percent usage time series and the configuration information describing the host device and the container name to produce datasets containing: a host_mac ID, a container ID, a container name, and the time series for CPU percent used.

In an embodiment, the aggregator service 234 may combine metrics with additional metadata identified from configuration information of other entities within the customer-host environment 120. For example, the data gathering service 232 may receive several different types of metrics such as a CPU percent usage time series for a specific container and metrics related to a replica set, both retrieved from a host. The metrics related to a replica set may include labels identifying pods within the replica set and the corresponding hosts running the pods as wells as their corresponding containers. The aggregator service 234 may augment the CPU percent usage time series, for a specific container, with labels from the other metrics or metadata to produce datasets containing: host_mac ID information, a container ID, a container name, and the time series for CPU percent used.

In an embodiment, the exporter service 236 is implemented to package a plurality of time series data into a data object and send the data object to the data collection system 110. For example, the exporter service 236 may package the plurality of time series data and associated metadata into a blob and send the blob to the data collection system 110. In other embodiments, the exporter service 236 may package the plurality of time series data into other data object types.

3.3 Example Tree Structure

Figure 3A:
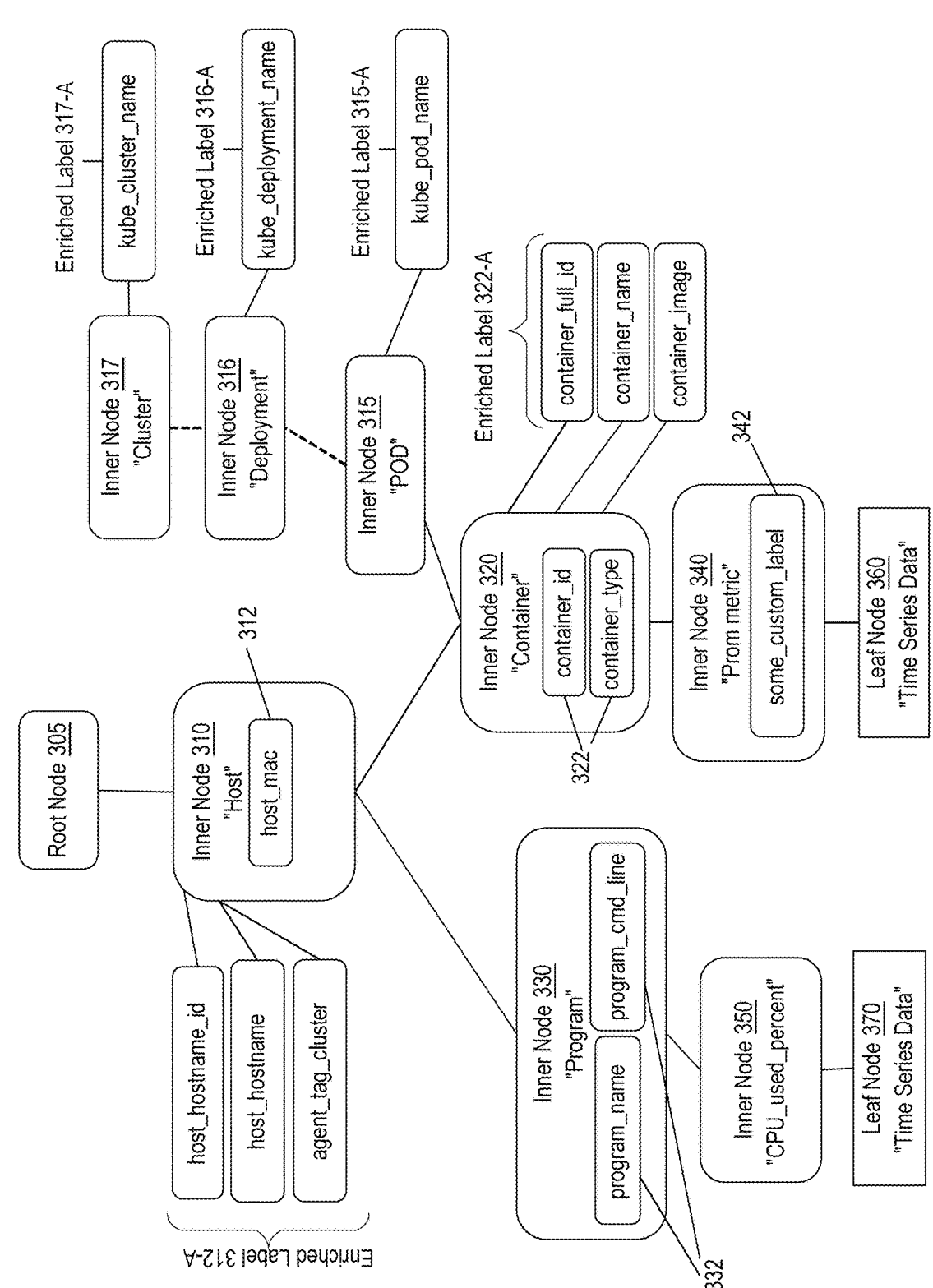
FIG. 3A is an example diagram of a tree structure used by a collector service to generate an augmented time series with enriched labels, in an embodiment.

FIG. 3A is an example diagram of a tree structure used by the collector service 212 to generate an augmented time series with enriched labels. Nodes within the tree structure represent relationships between entities used within the clustered application environment. The entities depicted in FIG. 3A represents only a sample of entities that may be part of the customer-host environment 120 and are meant to illustrate the relationships between the sample of entities depicted. Root node 305 represents the top node of the tree structure. The inner nodes each represent an entity type, such as host, container, program, cluster, deployment, pod, and different metrics. Each inner node may include one or more labels. Examples of labels include identifiers, names, addresses such as a mac address, and any other metadata that may be used to associate attributes to a time series. For example, inner node 310 represents a host entity and contains label 312 (host_mac), which represents the host entity's mac address. Label 312 may represent a basic contextual label. Inner node 320 represents a container entity and contains label 322 (container_id, container_type), which represents the container ID and container type for the container. Inner node 330 represents a program entity and contains label 332 (program_name, program_cmd_line), which represents the name of the program and the command line command for executing the program. Inner node 340 represents a specific custom metric that may be specified by a customer or other user, such as a Prometheus metric represented by "Prom metric". Label 342 (some_custom_label) represents a customized label for the customer metric such as "custom_value_1", which may represent a customized label for the specific Prometheus metric specified by the customer. In other examples, label 342 (some_custom_label), may be designated as any other metric label. Inner node 350 represents a metric "CPU_used_percent", associated with the program entity defined by node 350.

In an embodiment, nodes in the tree may be related to two or more parent nodes. For example, inner node 320 has parent node connections to inner node 310 and inner node 315, where inner node 315 represents a pod entity. Inner node 315 is related to inner node 316 and inner node 317, where inner node 316 represents a deployment entity and inner node 317 represents a cluster entity. The relationships between inner nodes 315, 316, and 317 are shown with dotted lines to indicate the presence of additional entities not shown. For example, there may be an additional node, replica set node, between inner node 316 and inner node 317. There may also be an additional node, namespace node, between inner node 316 and 317. For the purposes of clarity, nodes for the entities, replica set, and namespace have been omitted.

Leaf nodes 360 and 370 each represent time series values such as the value-timestamp pair of the time series. For example, leaf node 370 represents time series data for CPU percentage used for a program running on a host. Leaf node 360 represents time series data for a Prometheus metric "Prom metric". Time series data (leaf node 360) and time series data (leaf node 370) are leaf nodes in the tree structure and represent the values that make up the time series.

Enriched labels 312-A, 322-A, 315-A, 316-A, and 317-A each represent additional metadata associated with entities. In an embodiment, the additional metadata that make up the enriched labels 312-A, 322-A, 315-A, 316-A, and 317-A may be provided to the data collection system 110 by the customer-host agent 230 in the blob sent to the data collection system 110. Referring back to FIG. 3A, enriched label 312-A contains labels "host_instance_id", "host_hostname", and "agent_tag_cluster" and is associated with the host entity, inner node 310. Enriched label 322-A contains labels "container_full_id", "container_name", and "container_image" and is associated with the container entity, inner node 320. Enriched label 315-A represents the label "kube_pod_name" and is a pod name label that is derived from Kubernetes metrics. Enriched label 316-A represents the label "kube_deployment_name" and is a label representing the deployment name for that specific entity. Enriched label 317-A represents the label "kube_cluster_name" and is a label representing the name of the cluster. Each of the enriched labels 315-A, 316-A, and 317A have the prefix "kube_" as data for each of these enriched labels is derived from Kubernetes metrics. For inner node 330, mainly 312 and 312-A would be considered as enriched labels, to allow user devices to aggregate container-level metrics at the host level, for example. Labels 312, 312-A, 322, 322-A, 315-A, 316-A, and 317-A would be considered as enriched labels added to the metric represented by inner node 340, to enable user devices to aggregate process-level metrics at the container level or another higher level.

In an embodiment, the collector service 212 uses the tree structure illustrated in FIG. 3A to generate in-memory data objects containing links to other in-memory data objects that represent nodes defined by the tree structure. The collector service 212 generates an augmented time series with enriched labels by starting from a leaf node and traversing up the tree to each parent node and associating each of the node's labels and enriched labels to the time series. For example, leaf node 360 represents a time series for the prom metric represented by inner node 340. The collector service 212 augments the prom metric time series by first traversing up to inner node 340. At inner node 340, the collector service 212 would add label 342 (some_custom_label) to the time series. The collector service 212 would then traverse to inner node 320. At inner node 320, the collector service 212 would add label 322 (container_id, container_type) and enriched label 322-A (container_full_id, container_name, container_image) to the time series. The collector service 212 would then traverse to inner node 310 and would add label 312 (host_mac) and enriched labels 312-A (host_instance_id, host_hostname, agent_tag_cluster) to the time series. Referring back to inner node 320, the collector service 212 would also traverse to inner node 315, as inner node 315 is also a parent of inner node 320. At inner node 315, the collector service 212 would add enriched label 315-A (kube_pod_name) to the time series. The collector service 212 would continue to traverse up the tree to inner nodes 316 and 317 to add enriched labels 316-A (kube_deployment_name) and 317-A (kube_cluster_name) to the time series to generate an augmented time series.

In an embodiment, after generating the augmented time series, the collector service 212 would store the augmented time series by transforming the augmented time series into a table row entry for a time series database table. The time series database table is located in the time series database 316.

Figure 3B:
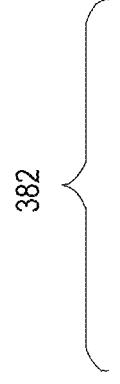
FIG. 3B is a logical representation of a time series database table for storing time series data with enriched labels, in an embodiment.

FIG. 3B is a logical representation of a time series database table for storing time series data with labels. Table 380 represents a time series table for storing custom "prom metric" time series values and the associated labels and enriched labels. In an embodiment, the collector service 212 would insert the values of the augmented time series into table 380. Columns in table 380 map to the associated labels and enriched labels in the augmented time series. For example, column "metric_name" contains the name of the metrics being stored such as "PROM_METRIC". The column "some_custom_label" maps to label 342 and contains the values for the "some_custom_label" such as "custom_value_1". The TimeSeries column represents a column that stores the time series for the PROM METRIC and contains a dataset of values and timestamps for the PROM_METRIC. The Container_ID column contains a container identifier value. The Container_Type column contains values specifying the type of container. The Container_Full_ID column contains values specifying a full or complete identifier for the container, such as "ithpjwhsyd6789". The Container_Image column contains a value representing the container image name, such as "img101". The Host_mac column contains values specifying the host machine mac address. The Host_hostname_ID column contains values specifying a hostname identifier such as "HR_prod". The Agent_Tag_Cluster column contains values specifying the cluster agent ID, such as "Agent_prod". Columns 382 represent columns of the table corresponding to enriched labels with customized label names. In an embodiment, the enriched labels may have customized label names that distinguish them from the original label from which the enriched labels were derived. For instance, original label "deployment" may be renamed as "kube_deployment_name" where "kube_deployment_name" contains a customized prefix that distinguishes the enriched label from the original label.

4.0 Procedural Overview

4.1 Data Collection System Processing

FIG. 4 depicts a flowchart for receiving metrics, storing metrics with enriched labels, and processing query requests for the metrics. The process described may be performed by a single program or multiple programs. The steps of the process as shown in FIG. 4 may be implemented using processor-executable instructions that are stored in computer memory. For the purposes of providing a clear example, the steps of FIG. 4 are described as being performed by computer programs executing on the data collection system 110. For the purposes of clarity, the process described may be performed with more or fewer steps than described in FIG. 4.

At step 402, the data collection system 110 receives an original dataset comprising data values for one or more metrics of a component of a clustered application environment and metadata associated with the data values for the one or more metrics. In an embodiment, the collector service 212 receives a blob from the customer-host agent 230 running in the customer-host environment 120. The blob may contain one or more time series datasets representing one or more metrics. Each of the time series datasets may include labels that contain metadata related to the metric. The blob may also contain additional metadata that describes relationships between entities running in the customer-host environment 120. For example, the additional metadata may contain information describing which containers belong to a replica set, which replica sets belong to a deployment and namespace, and which hosts contain pods and containers, and any other information describing relationships between entities.

At step 404, the data collection system 110 populates a tree structure containing a plurality of nodes, based on the data values for the one or more metrics and the metadata. In an embodiment, the collector service 212 populates the tree structure with a plurality of nodes, represented by in-memory data objects. Each node in the tree structure may represent a specific entity, such as a component in the clustered application environment, in the customer-host environment 120. For example, referring to FIG. 3A, if one of the time series datasets is a "prom_metric" time series, then the collector service 212 may populate the leaf node 360 with the time series dataset. Any custom labels associated with the "prom_metric" time series may populate inner node 340. Any container labels associated with the "prom_metric" time series may populate inner node 320, the container node.

In an embodiment, the collector service 212 may populate the tree structure with the metadata received in step 402. For example, if the metadata received in step 402 included additional container information, then the collector service 212 may populate inner node 320 with enriched labels such as "container_full_id", "container_name", and "container_image". The labels included in the time series dataset may be referred to as "labels", while the labels created from metadata received may be referred to as "enriched labels".

At step 406, the data collection system 110 generates an updated dataset containing the data values, one or more labels, and one or more enriched labels based on nodes in the tree structure. In an embodiment, the collector service 212 generates an augmented time series dataset by traversing the tree structure, starting from a leaf node and traversing up levels of the tree to the root node. For example, referring to FIG. 3A, the collector service 212 may generate an augmented tree structure for the custom prom_metric by starting at leaf node 360 and traversing up the tree structure to inner node 340. At inner node 340, the collector service 212 moves up one level to inner node 320. At inner node 320, the collector service 212 identifies labels 322 (container_id, container_type) and enriched labels 322-A (container_full_id, container_name, container_image) and adds labels 322 and 322-A to the augmented time series dataset. At inner node 320, the collector service 212 moves up one level to inner node 310. At inner node 310, the collector service 212 identifies label 312, which corresponds to host_mac, and adds label 312 to the augmented time series dataset. The collector service 212 also identifies enriched labels 312-A, which correspond to host hostname_id, host_hostname, and agent_tag_cluster. The collector service 212 adds enriched labels 312-A to the augmented time series dataset. Referring back to inner node 320, the collector service 212 traverses up to inner node 315. At inner node 315, the collector service 212 identifies enriched label 315-A (kube_pod_name) and adds the enriched label to the augmented time series dataset. The collector service then traverses up to inner node 316. At inner node 316, the collector service 212 identifies enriched label 316-A (kube_deployment_name) and adds the enriched label to the augmented time series dataset. The collector service then traverses up to inner node 317. At inner node 317, the collector service 212 identifies enriched label 317-A (kube_cluster_name) and adds the enriched label to the augmented time series dataset. In an embodiment, the enriched labels added, may receive customized enriched label names. For example, enriched label 316-A, kube_deployment_name, is a label representing a deployment name and has a custom prefix of "kube_". Enriched label 315-A, kube_pod_name, represents the pod name and has the custom prefix "kube_". Enriched label 317-A, kube_cluster_name, represents the cluster name and has the custom prefix "kube_" as well.

At step 408, the data collection system 110 stores the updated dataset in a database table. In an embodiment, the collector service 212 stores the augmented time series dataset in a database table in time series database 216. The time series database 216 may contain database tables that are configured to store the augmented time series dataset. For example, the augmented time series dataset generated at step 406 contains the following labels and enriched labels: some_custom_label, container_id, container_type, container_full_id, container_image, host_mac, host_hostname_id, agent_tag_cluster, kube_pod_name, kube_deployment_name, and kube_cluster_name. The collector service 212 may configure a time series database table to have columns corresponding to the labels and enriched labels in the augmented time series.

Referring to FIG. 3B, table 380 contains the following columns that correspond to the labels and enriched labels in the augmented time series: metric_name, some_custom_label, timeseries, container id, container_type, container_full_id, container_image, container_name, host mac, host_hostname_id, agent_tag_cluster, kube_pod_name, kube_deployment_name, and kube_cluster_name. Column metric_name is used to store the name of the metric, such as PROM_METRIC. The column, some_custom_label, is used to store the value of the associated custom label for the metric, in this case the value is custom_value_1. The time series column is used to store the time series data values and their corresponding timestamps for the augmented time series. The examples of the augmented time series and the table 380 represent one example set of labels and enriched labels. Other examples may contain more or less labels and enriched labels depending on the time series data and the metadata received from the customer-host environment 120.

Referring back to FIG. 4, at step 410, the data collection system 110 receives a query request for metrics. In an embodiment, the time series API processing service 214 may receive a query request for data stored in the time series database table from user device 140. For example, the query request may be a time series API-specific request that the time series API processing service 214 analyzes and determines is a request for aggregated data from table 380. Specifically, the query request may be a request for the average value of the "Prom metric" running on containers within a specific deployment specified by deployment name, such as "human resources."

At step 412, the data collection system 110 generates a result set containing at least a subset of data values from the plurality of data values in the database table, where the subset of values contains at least one enriched label of the one or more enriched labels. In an embodiment, the time series API processing service 214 may execute a database command corresponding to the query request to generate a result set that contains at least a subset of data values from the time series database. Using the above example where the query request is a request for the average value of the "Prom metric" running on containers within a specific deployment specified by deployment name, the result set may be based on a query of table 380 where kube_deployment_name equals the deployment specified in the query request, "human resources", and the results are averaged to produce the result set of the average value of the "Prom metric" that is part of the deployment "human resources". The result set may be sent back to the user device 140.

4.2 Customer-Host Agent Processing

FIG. 5 depicts a flowchart for packaging and sending metrics to the data collection system. The process may be performed by a single program or multiple programs. The steps of the process as shown in FIG. 5 may be implemented using processor-executable instructions that are stored in computer memory. For the purposes of providing a clear example, the steps of FIG. 5 are described as being performed by computer programs executing on the customer-host agent 230. For the purposes of clarity, the process described may be performed with more or fewer steps than described in FIG. 5.

At step 502, the customer-host agent 230 receives one or more data values corresponding to metrics from one or more monitoring services. In an embodiment, the customer-host agent 230 receives, from one or more monitoring services, data values representing metrics for components running in the customer-host environment 120. The one or more monitoring services may represent monitoring systems such as Prometheus, a Java Runtime agent, and any other monitoring service. The one or more data values received may be in the form of a time series dataset that contains data values for a specific metric, a corresponding timestamp referring to when the data value was observed, and one or more labels that represent attributes associated with the time series. Referring to FIG. 2C, the one or more data values may be represented by either the real time metrics 242, the java metrics 244, or other metrics 246. For example, if the monitoring service is Prometheus and the metric is container CPU usage, then the time series from Prometheus would contain CPU usage values at specific times for a specific container. The labels may identify the container by name, identifier, and any other relevant metric provided by Prometheus.

At step 504, the customer-host agent 230 retrieves, from one or more container management applications, metadata describing relationships between components running in a clustered application. In an embodiment, the customer-host agent 230, retrieves, from the one or more container management applications, metadata describing configuration relationships between components running in the customer-host environment 120. The one or more container management applications may represent applications such as a Kubernetes server. The customer-host agent 230 may, periodically, connect to the Kubernetes server and retrieve kubernetes events 252. In another embodiment, in response to state changes, errors, or other events to containers in the customer-host environment 120, the Kubernetes server may push kubernetes events 252 and/or container events 254 to the customer-host agent 230.

In an embodiment, the customer-host agent 230 may retrieve configuration information from hosts in the customer-host environment 120. For example, if the customer-host agent 230 is running on a specific host machine, then the customer-host agent 230 may access configuration information for the specific host machine. The configuration information may describe how components, such as hosts, containers, pods, replica sets, deployments, and namespaces are configured. The configuration information may be used to supplement the time series data and metadata received from the monitoring services and retrieved from the container management services.

At step 506, the customer-host agent 230 packages the one or more data values and the metadata into a formatted dataset. In an embodiment, the customer-host agent 230 packages the data values and the metadata into a blob to send to the data collection system 110. In other embodiments, the customer-host agent 230 may package the data values and the metadata into any other data object that may be sent to the data collection system 110.

At step 508, the customer-host agent 230 sends the formatted dataset to a processing server. In an embodiment, the customer-host agent 230 sends the formatted dataset to the data collection system 110 for processing and storing.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
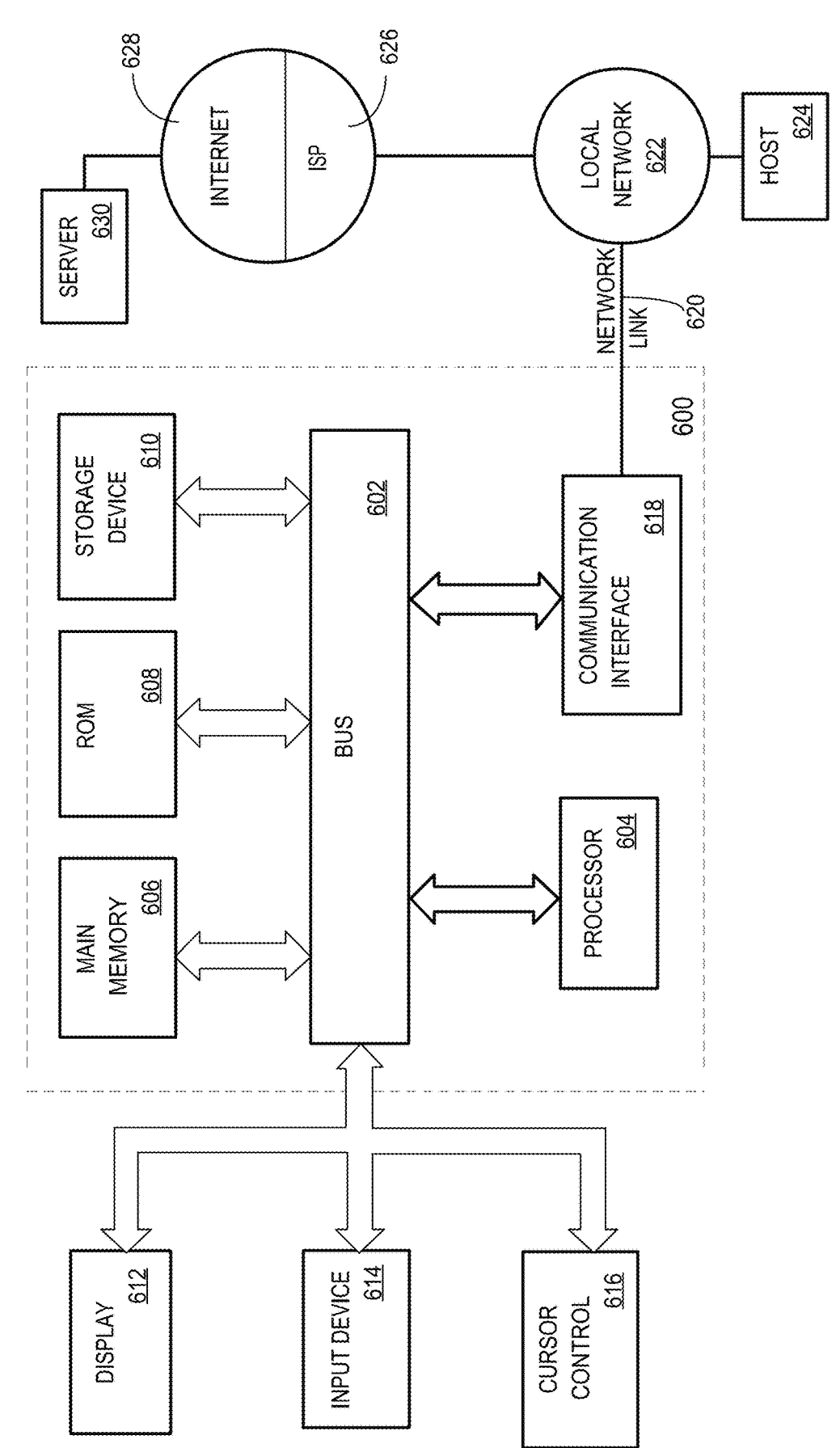
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, and any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface

618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for monitoring a computer system and storing metrics for generating responses to queries about the computer system, the computer-implemented method comprising:

receiving from a software agent of the computer system:
(1) a first group of information that includes first data and first metadata, the first data including a first value of a metric of a monitored software component of the computer system, and the first value being measured during execution of an application in the computer system, and (2) a second group of information separate from the first group, that includes second metadata identifying execution relationships between the monitored software component and other software components of the computer system;

populating a tree data structure in memory or storage of the computer system to store the first data and the first and second metadata, wherein the tree data structure includes a plurality of nodes that each corresponds to one of a plurality of software components of the computer system, each of the nodes being linked to at least one of the other nodes according to execution relationships between the plurality of software components;

updating the tree data structure in the memory or storage to store third metadata that adds execution context for the plurality of software components;

generating an updated dataset by traversing the nodes according to the links between the nodes and then persisting the updated dataset in a database table stored in a storage device of the computer system, wherein the persisted database table includes a plurality of records, one of the records including the first data and the first, second, and third metadata;

in response to a query from a user computer for performance information of the computer system, locating in the persisted database table, records corresponding to a value specified for the third metadata by the query; and generating a result based on the located records and then transmitting the result to the user computer.

2. The computer-implemented method of claim 1, wherein the located records are located by executing only a single read operation on the persisted database table.

3. The computer-implemented method of claim 1, wherein the plurality of software components includes at least one of a process, a container, a namespace, a pod, a cluster node, and a cluster.

4. The computer-implemented method of claim 1, wherein the first and second groups of information are received as a binary large object (blob).

5. The computer-implemented method of claim 1, wherein the first data includes a value-and-timestamp pair.

6. The computer-implemented method of claim 1, further comprising:

creating a customized name for the third metadata, wherein the customized name describes a source of the third metadata and is different from names of any other metadata of the persisted database table.

7. The computer-implemented method of claim 1, wherein generating the updated dataset, comprises:

locating a leaf node in the tree data structure, wherein the leaf node is associated with the first data;

identifying the first data based on the association thereof with the leaf node; and for each of a plurality of levels in the tree data structure, traversing up the tree data structure to a parent node and then identifying metadata associated with the parent node.

8. The computer-implemented method of claim 1, wherein the persisted database table comprises a column that contains the first data, a column that contains the first metadata, a column that contains the second metadata, and a column for the third metadata.

9. One or more non-transitory computer-readable media storing computer program instructions which, when executed by one or more processors, cause the one or more processors to perform a computer-implemented method for monitoring a computer system and storing metrics for generating responses to queries about the computer system, the computer-implemented method comprising:

receiving from a software agent of the computer system: (1) a first group of information that includes first data and first metadata, the first data including a first value of a metric of a monitored software component of the computer system, and the first value being measured during execution of an application in the computer system, and (2) a second group of information separate from the first group, that includes second metadata identifying execution relationships between the monitored software component and other software components of the computer system;

populating a tree data structure in memory or storage of the computer system to store the first data and the first and second metadata, wherein the tree data structure includes a plurality of nodes that each corresponds to one of a plurality of software components of the computer system, each of the nodes being linked to at least one of the other nodes according to execution relationships between the plurality of software components;

updating the tree data structure in the memory or storage to store third metadata that adds execution context for the plurality of software components;

generating an updated dataset by traversing the nodes according to the links between the nodes and then persisting the updated dataset in a database table stored in a storage device of the computer system, wherein the persisted database table includes a plurality of records, one of the records including the first data and the first, second, and third metadata;

in response to a query from a user computer for performance information of the computer system, locating in the persisted database table, records corresponding to a value specified for the third metadata by the query; and generating a result based on the located records and then transmitting the result to the user computer.

10. The one or more non-transitory computer-readable media of claim 9, wherein the first and second groups of information are received as a binary large object (blob).

11. The one or more non-transitory computer-readable media of claim 9, wherein the first data includes a value-and-timestamp pair.

12. The one or more non-transitory computer-readable media of claim 9, wherein generating the updated dataset, comprises:

locating a leaf node in the tree data structure, wherein the leaf node is associated with the first data;

identifying the first data based on the association thereof with the leaf node; and for each of a plurality of levels in the tree data structure, traversing up the tree data structure to a parent node and then identifying metadata associated with the parent node.

13. The one or more non-transitory computer-readable media of claim 9, wherein the persisted database table comprises a column that contains the first data, a column that contains the first metadata, a column that contains the second metadata, and a column for the third metadata.

14. A computer system including at least one processor and memory coupled to the at least one processor, the memory being loaded with computer program instructions that, when executed on the at least one processor, cause the at least one processor to carry out a computer-implemented method for monitoring the computer system and storing metrics for generating responses to queries about the computer system, the computer-implemented method comprising:

receiving from a software agent of the computer system: (1) a first group of information that includes first data and first metadata, the first data including a first value of a metric of a monitored software component of the computer system, and the first value being measured during execution of an application in the computer system, and (2) a second group of information separate from the first group, that includes second metadata identifying execution relationships between the monitored software component and other software components of the computer system;

populating a tree data structure in memory or storage of the computer system to store the first data and the first and second metadata, wherein the tree data structure includes containing a plurality of nodes that each corresponds to one of a plurality of software components of the computer system, each of the nodes being linked to at least one of the other nodes according to execution relationships between the plurality of software components;

updating the tree data structure in the memory or storage to store third metadata that adds execution context for the plurality of software components;

generating an updated dataset by traversing the nodes according to the links between the nodes and then persisting the updated dataset in a database table stored in a storage device of the computer system, wherein the persisted database table includes a plurality of records, one of the records including the first data and the first, second, and third metadata;

in response to a query from a user computer for performance information of the computer system, locating in the persisted database table, records corresponding to a value specified for the third metadata by the query; and generating a result based on the located records and then transmitting the result to the user computer.

15. The one or more non-transitory computer-readable media of claim 9, wherein the located records are located by executing only a single read operation on the persisted database table.

16. The computer system of claim 14, wherein the located records are located by executing only a single read operation on the persisted database table.

17. The computer system of claim 14, wherein the plurality of software components includes at least one of a process, a container, a namespace, a pod, a cluster node, and a cluster.

18. The computer system of claim 17, wherein the first data measures one of: usage of a central processing unit (CPU), usage of memory, network latency, and processing latency, wherein the first and second metadata are each one of: a name or command line of the application, an identifier or type of the container, and a media access control (MAC) address of the cluster node, and wherein the third metadata is one of: a name or image of the container, an identifier, name, or tag of the cluster node, a name of the pod, and a name of the cluster.

19. The computer system of claim 17, wherein the execution relationships between the plurality of software components include at least one of: the container executing in a host, the container executing in the pod, and the pod executing in the cluster.

* * * * *